United States Patent [19]
Cheng

[11] Patent Number: 6,055,104
[45] Date of Patent: Apr. 25, 2000

[54] OPTICAL ATTENUATOR

[76] Inventor: Yihao Cheng, 36 Meadowbreeze Drive, Kanata, Ontario, Canada, K2M 2L6

[21] Appl. No.: 09/082,517

[22] Filed: May 21, 1998

Related U.S. Application Data

[63] Continuation-in-part of application No. 09/045,946, Mar. 23, 1998.
[51] Int. Cl.[7] .................................. G02B 5/30; G02B 6/00
[52] U.S. Cl. ........................ 359/495; 359/494; 359/501; 385/11; 385/140
[58] Field of Search ...................... 385/140, 11; 359/484, 359/494, 495, 493, 501, 496, 497; 356/370, 368; 372/703

[56] References Cited

U.S. PATENT DOCUMENTS

| | | | |
|---|---|---|---|
| 4,239,329 | 12/1980 | Matsumoto . | |
| 5,033,830 | 7/1991 | Jameson | 359/484 |
| 5,276,747 | 1/1994 | Pan | 385/34 |
| 5,499,132 | 3/1996 | Tojo et al. | 359/484 |
| 5,546,219 | 8/1996 | Iida | 359/484 |
| 5,689,359 | 11/1997 | Kurata et al. | 359/484 |
| 5,727,109 | 3/1998 | Pan et al. | 385/140 |
| 5,867,300 | 2/1999 | Onaka et al. | 359/584 |

Primary Examiner—Cassandra Spyrou
Assistant Examiner—John Juba, Jr.
Attorney, Agent, or Firm—Neil Teitelbaum & Associates

[57] ABSTRACT

A polarization beam splitter combiner uses a birefringent crystal that is a fraction of the size of conventional crystals used in similar devices. Since the crystal is considerably shorter in length, the beam passing through the crystal can be uncollimated, spreading very little from one end to the other. Launching uncollimated beams through a short small crystal obviates the requirement for lenses at the end face of the crystal having two waveguides coupled thereto. Since lenses are not required the waveguides at the input/output end face can be very closely spaced apart. Conventional lensed devices utilizing a pair of lenses at an input/output end face must be considerably larger in order to accommodate the lenses and resulting collimated beams.

3 Claims, 6 Drawing Sheets

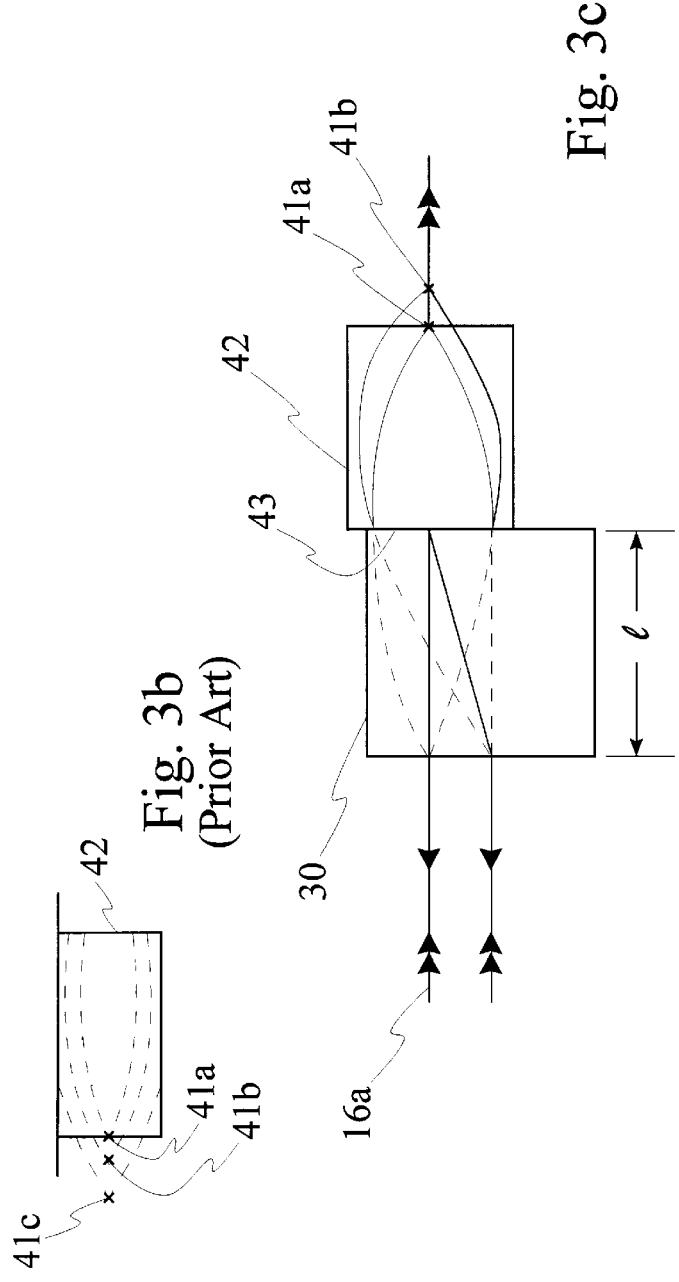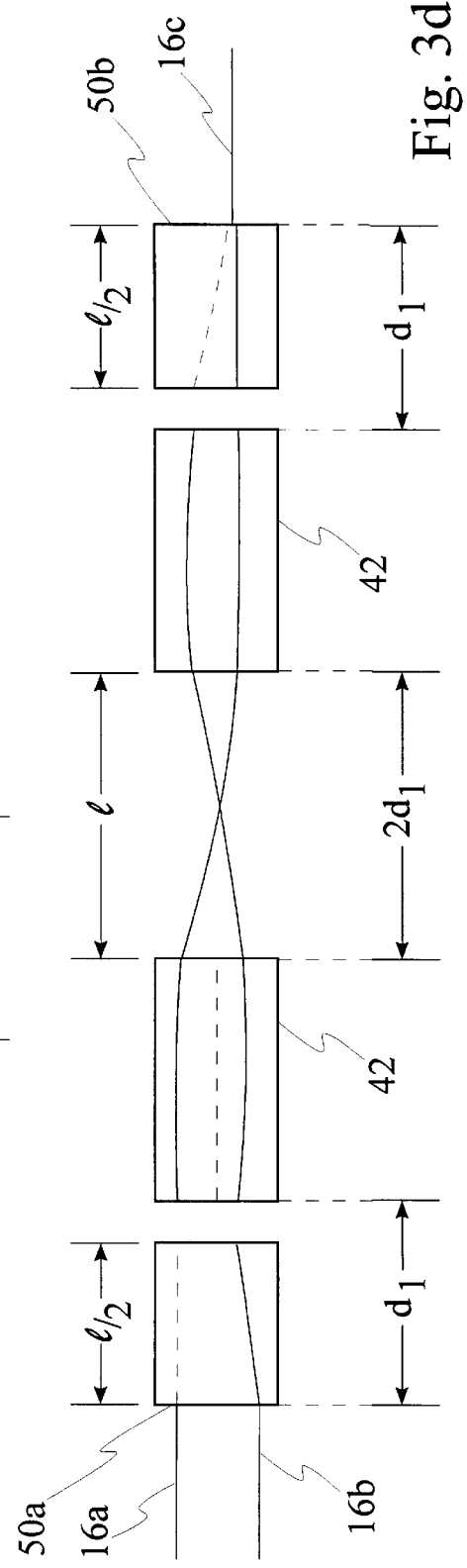

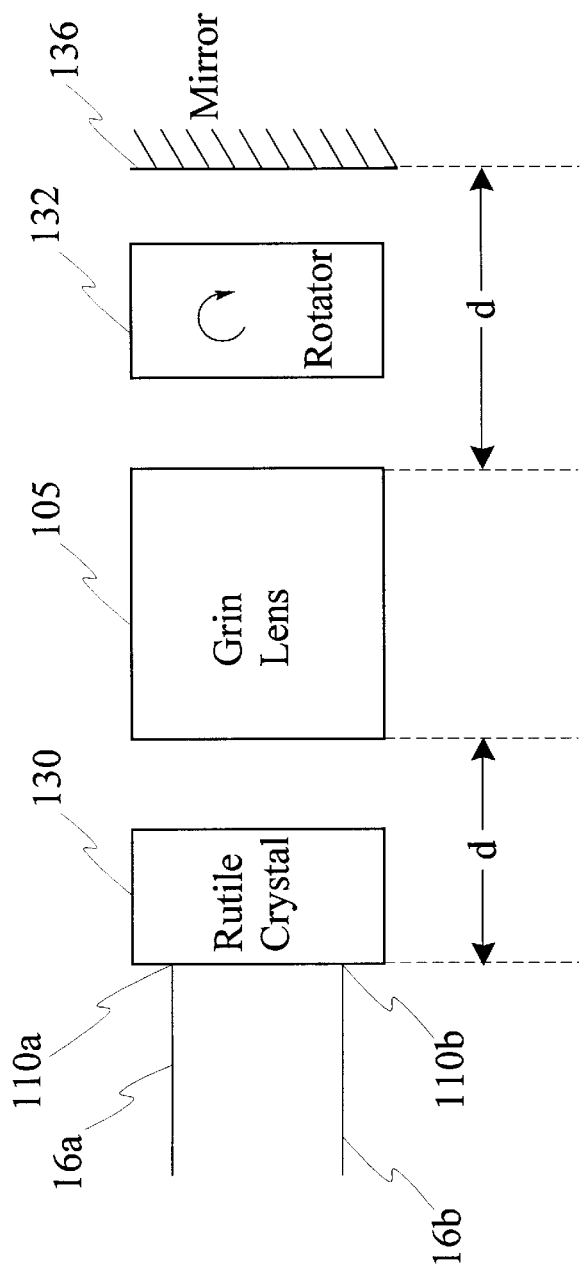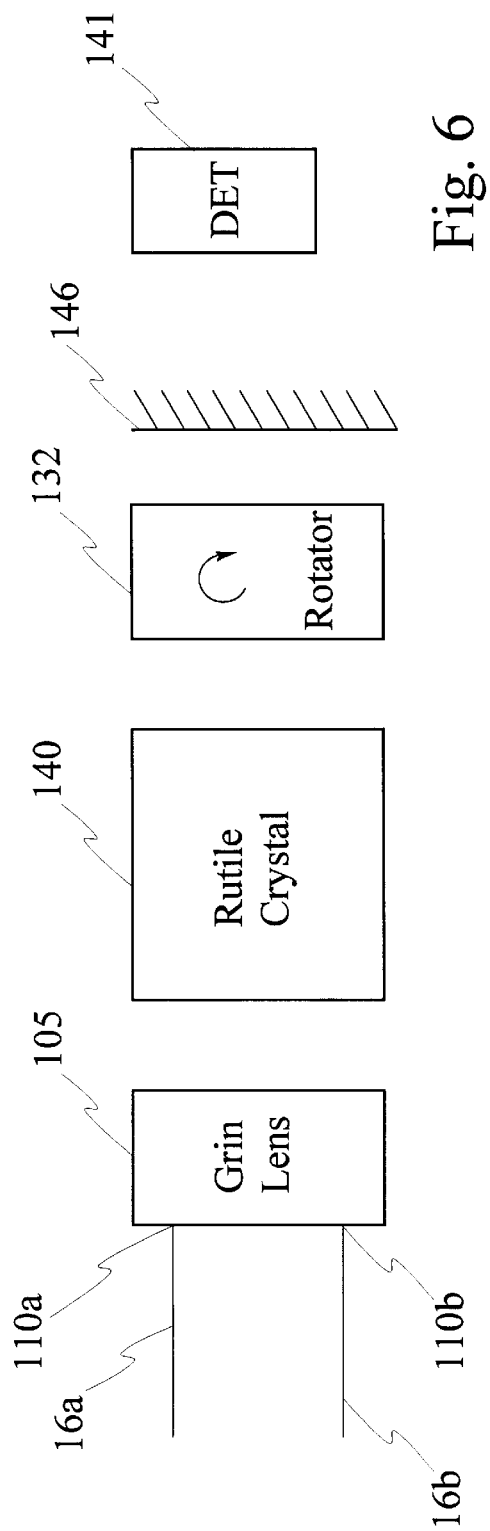

OPTICAL ATTENUATOR

This application is a continuation in part of ser. No. 09/045,946 filed Mar. 23, 1998.

FIELD OF THE INVENTION

This invention relates to an optical attenuator for controllably attenuating optical signals.

BACKGROUND OF THE INVENTION

Many optical attenuators are known in the art. Some of these, use polarizing beam-splitters also known in the art, each having disadvantages. Furthermore, attenuators utilizing beam splitting to split an incoming beam into two polarized beams, have required one beam splitter to split an incoming beam into two orthogonally polarized beams, and one substantially identical beam splitter to combine the polarized beams into a single beam of light. Providing a matched pair of crystals can be challenging and is costly.

The Glan-Thompson polarizer, which is a block of birefringent material cut into prisms and then cemented together acts by reflecting one polarization component at the cement interface and by transmitting the other. The device requires a considerable amount of birefringent material, generally calcite, which is scarce and expensive, and is unable to work with high powered lasers and ultraviolet light, since the light destroys or clouds cement. Furthermore, this beam-splitter, which makes use of the reflected polarization component, suffers from the added disadvantage that polarized beams exit the device at inconvenient angles, for example 45 degrees, when it is often useful that beams are parallel, orthogonal or otherwise oriented.

The Glan-Taylor polarizer which is similar to the Glan-Thompson polarizer but uses an air space instead of cement to separate polarization components can work with many light sources but suffers from reflection loss and ghosting caused by the air gap.

The Wollaston, Rochon and Senarmont beam-splitters, which separates polarization components by transmitting the components through an interface, permit optical contacting for use with most light sources, but produce beams which also exit at inconvenient angles, with one or both polarization components suffering from chromatism and distortion.

The double refracting element (beam displacer), which produces parallel polarized beams of light, achieves small beam separation and limited field. Also, since the beams may pass through a considerable amount of material before achieving useful separation, wavefront distortion can occur in the extraordinary beam due to imperfections in the crystal's structure. (See for example, "Birefringence of Quartz and Calcite", Journal of the Optical Society of America, volume 49, No. 7, Jul. 1959, pages 710–712.) Beam separation can be further limited by the small size and high cost of suitable crystals. Notwithstanding, it is an object of the invention to overcome some of these limitations while using a beam displacing crystal. Polarizing prisms and their various defects are described in detail by Bennett and Bennett, "Polarization", Handbook of Optics, Driscoll and Vaughan, eds., McGraw-Hill, 1978.

U.S. Pat. No. 5,727,109 incorporated herein by reference, in the name of E-tek Dynamics discloses an Optical Attenuator having two lenses, two crystals and a liquid crystal cell for varying the polarization of optical beams passing therethrough. Although this device may perform its intended function, there are several drawbacks to this design. For example, it requires the provision of two substantially thick optical crystals to accommodate a collimated beam provided by a collimating lens. Since these crystals must be large in order to accommodate and separate a collimated beam, their cost is quite significant. Furthermore, This device requires a pair of crystals, yet further adding to the cost of the device. And still further, care must be taken to provide substantially matched crystals, adding further to the cost of manufacture of this device. And yet another drawback of this design is its size, which is larger than would be preferred by some.

The present invention obviates most or all of these disadvantages and results in a small relatively inexpensive optical attenuator.

It is an object of this invention, to provide, in a first embodiment a polarization beam splitter that obviates most of the above mentioned disadvantages of prior art devices, and an optical attenuator that is less complex and less costly to manufacture; it is yet a further object to provide in one embodiment, a device having as its core element a birefringent crystal that is considerably less costly to manufacture than commercially available birefringent crystal based devices.

It is yet a further object of the invention to provide a polarization beam splitter that requires a much smaller crystal than conventional commercially available devices that utilized a same type of beam shifting crystal.

It is a primary object of this invention to provide an optical attenuator that only requires a single splitting/combining optical element for splitting an optical beam incident thereon, into two substantially orthogonally polarized beams and for combining the beams into a single beam.

It is yet a further object of the invention to provide an optical attenuator that has a reflective folded configuration.

SUMMARY OF THE INVENTION

In accordance with this invention, there is provided, an optical attenuator comprising: an input optical waveguide and an output optical waveguide, ends of the waveguides being optically aligned such that at least a portion of light launched into the input waveguide is directed to the output waveguide; a deflecting element for deflecting light incident thereon that has been launched into the input waveguide in a substantially opposite direction toward the output waveguide;

a birefringent crystal disposed between the deflecting element and the input and output waveguides for splitting an input beam into a first beam of a first polarization and a second beam of a second orthogonal polarization;

controllable polarization rotator for selectively rotating the polarization of light passing therethrough; and, lens means disposed between the optical waveguides and the deflecting means.

In accordance with the invention, optical attenuator is provided comprising: an input waveguide and an output waveguide;

a lens having a substantially collimating end face and a substantially focusing end face; a birefringent crystal coupled with the lens for separating or combining orthogonal polarized beams of light;

a deflector for directing an incident beam launched into the input waveguide toward the output waveguide, the input and output waveguides adjacent the lens for launching light to the lens or for receiving light from the lens, the waveguides each having ends separated a nearest end of the lens by an optical distance of approximately $d_1$, an optical distance between the substantially collimating end face of the lens and the deflector being d1, wherein $d_1>0$; and, a polarization rotator disposed between the birefringent crystal and the deflector for rotating the polarization of light passing therethrough.

In accordance with the invention, an optical attenuator is provided comprising:

an input port and an output port at a first end of the device;

a lens having a substantially collimating end face and a substantially focusing end face;

a birefringent crystal coupled with the lens for separating or combining orthogonal polarized beams of light, the birefringent crystal being disposed adjacent to the input and output ports to receive uncollimated light from the input port;

a deflector for directing an incident beam launched into the input waveguide toward the output port, the input and output ports adjacent the lens for launching light to the lens or for receiving light from the lens, the ports separated a nearest end of the lens by an optical distance of approximately $d_1$, an optical distance between the substantially collimating end face of the lens and the deflector being d1, wherein $d_1>0$; and, a polarization rotator disposed between the birefringent crystal and the reflective surface, for rotating the polarization of light passing therethrough.

Advantageously, this invention provides a structure that requires a substantially smaller (approximately $1/50^{th}$ the size of) birefringent crystal than is required in most commercially available devices of a similar design utilizing birefringent beam shifting crystals.

BRIEF DESCRIPTION OF THE DRAWINGS

Exemplary embodiments of the invention will now be described in conjunction with the drawings, in which:

FIG. 3b is a side view of a prior art, substantially quarter-pitch GRIN lens;

FIG. 3c is a top view of a polarization beam splitter as is shown in FIG. 3a having a single GRIN lens;

FIG. 3d is a top view of an alternative embodiment of a polarization beam splitter in accordance with the invention wherein two crystals and two lenses are used to minimize a beam diameter propagating through the lenses and to enhance the coupling of light between ports;

FIG. 5 is an embodiment of an optical attenuator in accordance with the invention wherein a corner cube is used to provide a folded configuration;

FIG. 6 is an alternative embodiment of an optical attenuator similar to that shown in FIG. 5, however having two lenses at the input/output end; and, FIGS. 7, 8, and 9 are views of a prior art optical attenuator;

DETAILED DESCRIPTION

Figure 1:
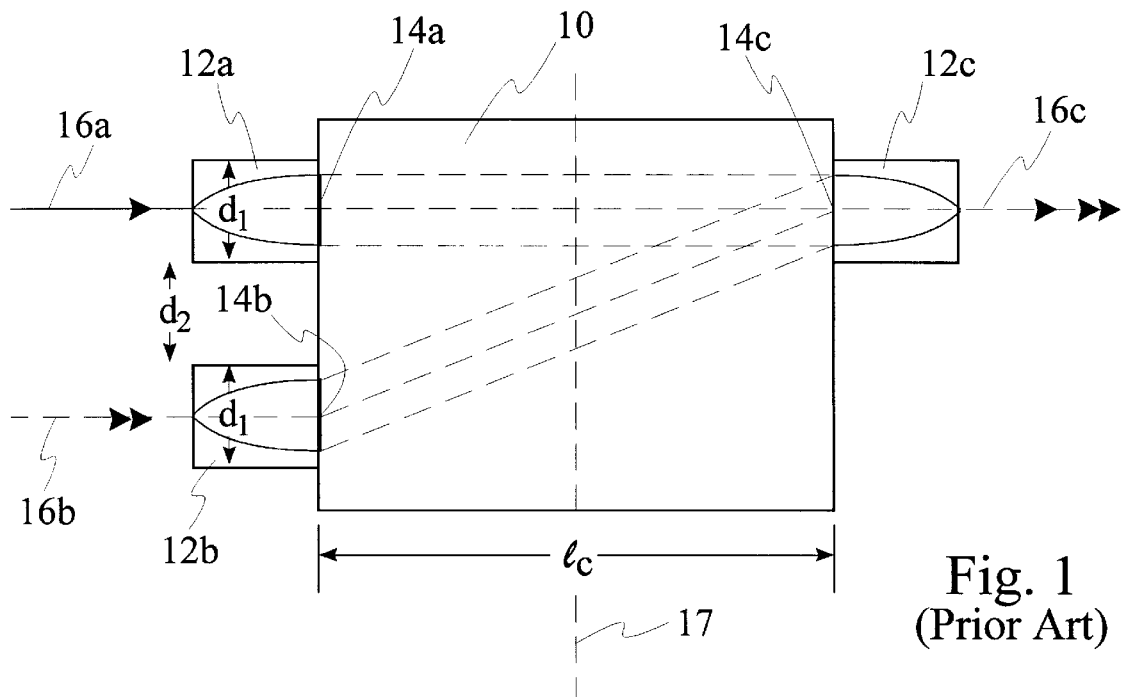
FIG. 1 is a top view of a prior art polarization beam splitter.
Figure 2:
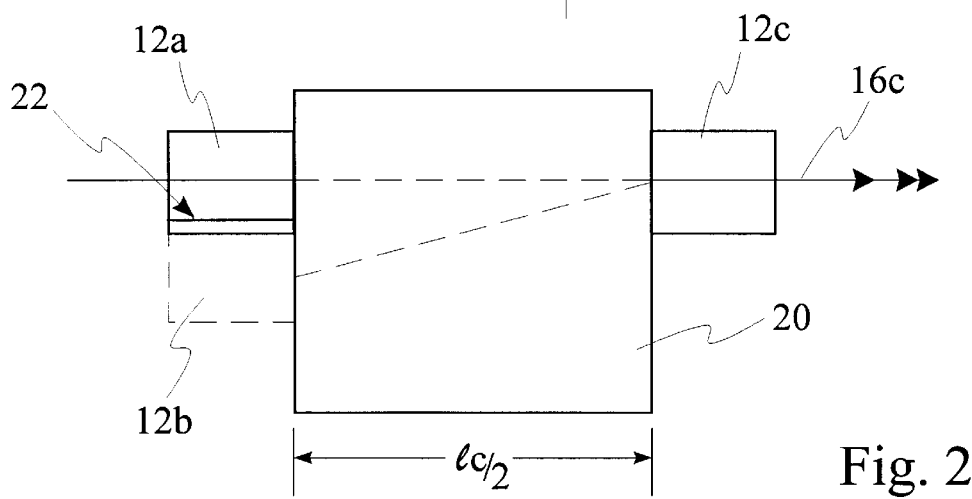
FIG. 2 is a top view of polarization beam splitter that is not functional due to its short crystal length.

Fig. 1 depicts a well known polarization beam splitter/coupler design, wherein a birefringent crystal 10 such as a calcite crystal is disposed adjacent three quarter pitch focusing/collimating graded index lenses, 12a and 12b at a first end face and 12c at an opposite end face of the crystal disposed to receive light from the other two lenses. It is noted in FIG. 1, that the beam widths 14a, 14b at an end face of one of the lenses denoted by a heavy black line at the lens-crystal interface, defines a length that is less than the minimum size of the crystal end face, which must be sized to accommodate the beams including some additional adjustment space denoted by the length $d_2$. Stated differently, since the GRIN lenses 12a and 12b each have a diameter of $d_1$, and there is some adjustment/tuning space $d_2$ between the lenses 12a and 12b, the crystal must have a width sufficient to accommodate the sum of the lengths $S=d_1+d_1+d_2$. Furthermore, as the length S increases due to particular design requirements for $d_1$, or $d_2$ to increase, the overall length of the crystal $1_c$ must also increase. Conversely if the crystal is to be shortened, for example half as long as it is in FIG. 1, the available space to place the lenses 12a and 12b becomes less. This is illustrated in FIG. 2 in a non-working embodiment, wherein the crystal length is $l_c/2$ and sufficient space to place the lenses 12a and 12b is not available, denoted by the lenses being overlapped in the figure. Hence the requirement to use lenses that will collimate light propagating through the crystal 10, places a constraint on using a crystal that is sized to at least accommodate two lenses or collimated beams of light.

Figure 3A:
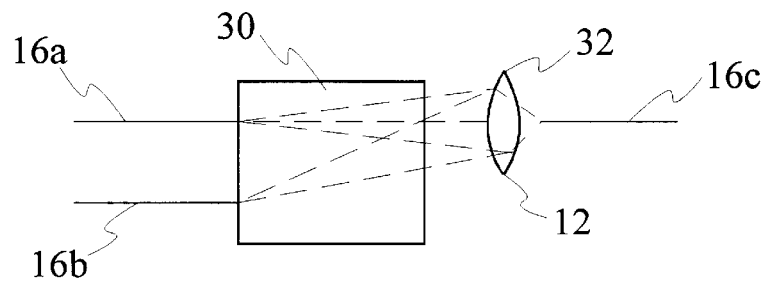
FIG. 3a is a top view of a polarization beam splitter in accordance with an embodiment of the invention wherein uncollimated light is launched through a birefringent crystal.

In accordance with an aspect of this invention, and referring to FIG. 3a, a polarizing beam splitter/combiner is shown having two waveguides in the form of optical fibres 16a and 16b directly coupled, using fibre tubes, not shown, to an end face of a small birefringent crystal 30. It should be particularly noted, that the size of the crystal 30 required in the embodiment of FIG. 3a is approximately $1/50^{th}$ the size of the crystal 10 required in the conventional beam splitter shown in FIG. 1. Hence, the cost saving of manufacturing the device of FIG. 3a is significantly less than the device of shown in FIG. 1. Yet still further, only one lens is required in the first embodiment of the invention, compared with three lenses required in the prior art device shown in FIG. 1. In FIG. 3a, an output optical waveguide in the form of an optical fibre is disposed a distance from the end face of the crystal 30 A lens 32 is disposed between the optical fibre 16c and the crystal 30 for coupling light between the optical fibres 16a and 16c and between the optical fibres 16b and 16c. In this embodiment since the optical fibres 16a and 16b can be very close to one another, the size of the crystal 30 can be made very small, resulting in considerable cost savings. Furthermore it becomes practicable to propagate beams from the fibres 16a and 16b through the crystal 30 as uncollimated beams, and to couple these beams with the optical fibre 16c via a lens 32, only if the crystal is very short in length; it is apparent that the beam diameter propagating through the crystal increases as the length of the crystal increases.

In operation, the device shown in FIG. 3a works in the following manner. As a beam splitter, light of unknown polarization is launched into optical fibre 16c, which functions as an input port. As the beam traverses the crystal 30 it separates into two beams. The o-ray polarized beam is directed by the crystal port 16a and the e-ray polarized light is directed to port 16b. Conversely combining is performed in a same manner in an opposite direction. Since no lens is present between the fibres 16a, 16b and the crystal 30, light traversing the short length of the crystal is non-collimated.

Currently, in many optical devices, lenses of various types are used to collimate a diverging light beam exiting an optical waveguide and to focus light that is launched into an optical waveguide so as to more efficiently couple the light.

One of the most ubiquitous building blocks used in the design and manufacture of optical elements is the graded index (GRIN) lens. Lenses of this type are produced under the trade name "SELFOC"; the mark is registered in Japan and owned by the Nippon Sheet and Glass Co. Ltd. GRIN lenses in combination with other optical elements are used in the manufacture of WDM devices, optical couplers, circulators, isolators, and other devices. The use of a GRIN lens in this invention provides a number of advantages over other conventional lenses, however does not limit the invention to only GRIN lenses.

Advantages of GRIN lenses are that they are relatively inexpensive, compact, and furthermore have parallel flat end faces. In particular, the flat end face of the GRIN lens allows a single lens to be used as a means of collimating or focusing the light, and as well, as a means of tapping light reflected from the end face of the lens.

Referring now to FIG. 3b a substantially quarter pitch GRIN lens is shown, with traces of three beams launched from three locations, 41c, 41b, and 41a adjacent an end face of the lens 42. The beam launched from location 41c is shown to be expanding and entering the lens with a wider diameter than the other two beams launched from locations 41b and 41a. This also illustrates that when light is launched into the opposite end of the lens as a collimated beam, the focusing location(s) of the beam is dependent upon the beam diameter.

If light is to be efficiently coupled through a lens, such as a GRIN lens, it is preferred to launch a beam having a narrow diameter into the lens. Thus, in FIG. 3a, if the beam entering the lens 32 propagating toward the optical fibre 16c from one of 16a and/or 16b has a diameter that is too wide, some of the light entering the periphery of the lens will not be efficiently coupled into the receiving end of the optical fibre 16c.

FIG. 3d illustrates an alternative embodiment of the invention wherein the beam propagating from the optical fibre 16a toward 16c has a relatively small diameter, and wherein the diameter of the beam entering the lenses 42 is approximately half of the diameter of the beam entering the lens 42 in the arrangements shown in FIG. 3c or 3a.

Figure 4A:
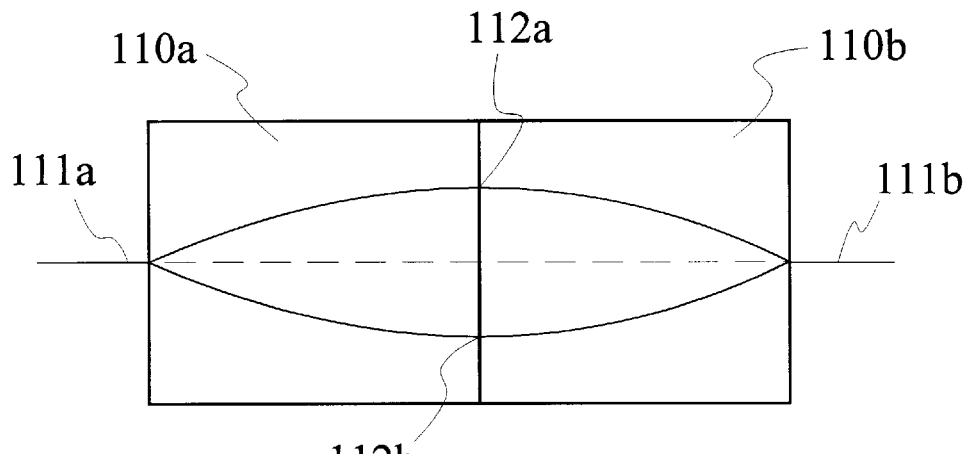
FIG. 4a is a side view of a prior art arrangement of a pair of back to back quarter pitch GRIN lenses having input/output waveguides positioned along the optical axes of the lenses.
Figure 4B:
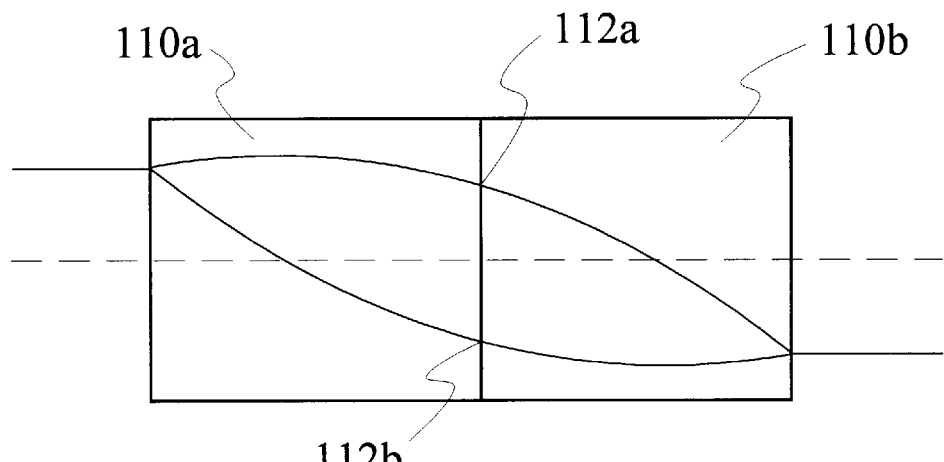
FIG. 4b is a side view of a prior art arrangement of a pair of back to back quarter pitch GRIN lenses having input/output waveguides positioned offset from the optical axes of the lenses.

Turning now to FIG. 4a, a pair of quarter pitch GRIN lenses 110a and 110b are shown having their collimating ends inwardly facing and their focusing ends outwardly facing. Two optical waveguides 111a and 111b are shown coaxial with and coupled to the lenses along at the optical axis of the lenses 110a and 110b shown by a dotted line. A beam profile is also shown within the lenses 110a and 111b as if light was launched from one of the waveguides 111a and 111b to a respective lens. It should be noted that the beam profile at the interface between the two lenses extends to a circumference about the lens indicated by points 112a and 112b being two points on the circumference. FIG. 4b illustrates the same pair of GRIN lenses as in FIG. 4a, however the two optical waveguides 111a and 111b are shown to be offset a same optical distance from the common optical axis of the lenses 110a and 110b Here, the beam profile at the interface between the two lenses extends to the same circumference as in FIG. 4a, however the angle of the beam has varied. By ensuring that there is no separation between the two lenses, and that the optical waveguides are directly coupled with respective lenses, light is most effectively coupled from one waveguide 111a into the other 111b (or vice versa) when the waveguides are parallel to the common optical axis shared by the lenses. A similar arrangement is shown in FIG. 4c, wherein input/output waveguides 111a and 111b are disposed on opposite sides of the optical axis of the lens, from that in Fig. 4b.

Figure 4C:
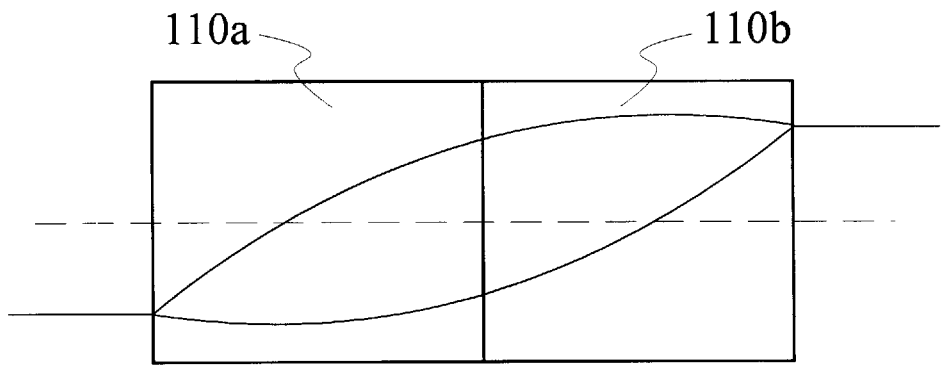
FIG. 4c is a side view of a prior art arrangement of a pair of back to back quarter pitch GRIN lenses having input/output waveguides positioned offset from the optical axes of the lenses.
Figure 4D:
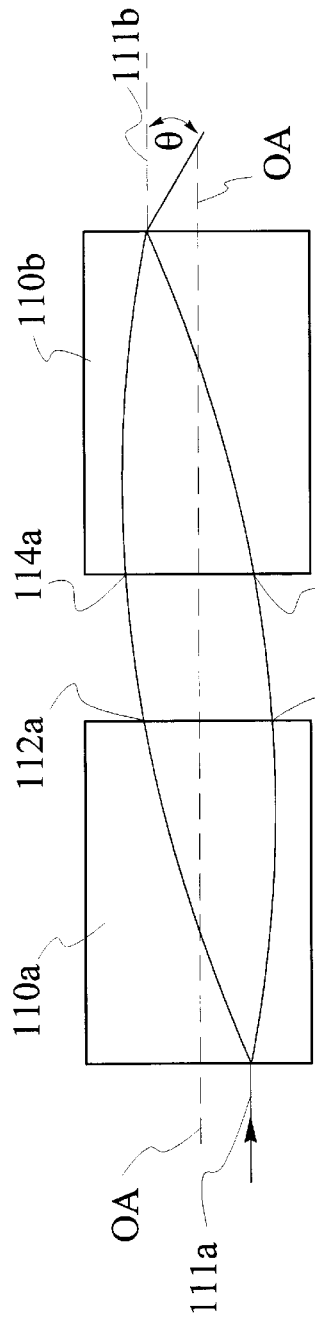
FIG. 4d is a side view of an arrangement of a pair of back to back spaced GRIN lenses having input/output waveguides positioned offset from the optical axes of the lenses.

Referring now to FIG. 4d, the lenses shown in FIG. 4c are now spaced apart a fixed distance. The optical axis of the waveguide 111a is shown to be parallel to the optical axis OA of the lens 110a. However, in order to efficiently couple light from the output waveguide 111b it must be non-parallel to the input waveguide 111a and at an angle with respect to the optical axis of the lens 110b, dependent upon the amount of separation. Essentially as the separation increases between the two lenses, the output beam diverges from the optical axis of lens 110b.

Figure 4E:
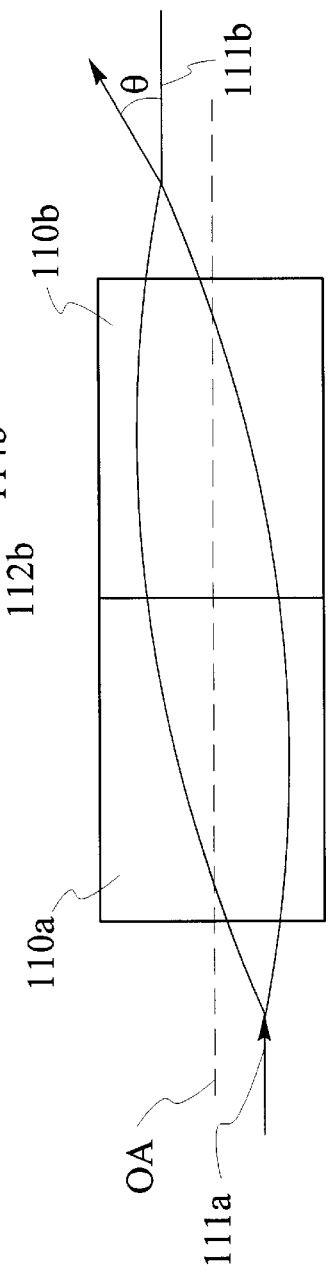
FIG. 4e is a side view of an arrangement of a pair of back to back GRIN lenses having input and output waveguides spaced from the lenses.

In FIG. 4e the lenses 110a and 110b are shown having no gap between them, however, the input and output optical waveguides 111a and 111b are spaced from the end faces of the lenses they are optically coupled therewith. As a result of this gap, the light coupling into the optical fibre 111b is at an angle and light does not couple efficiently into the waveguide.

Figure 4F:
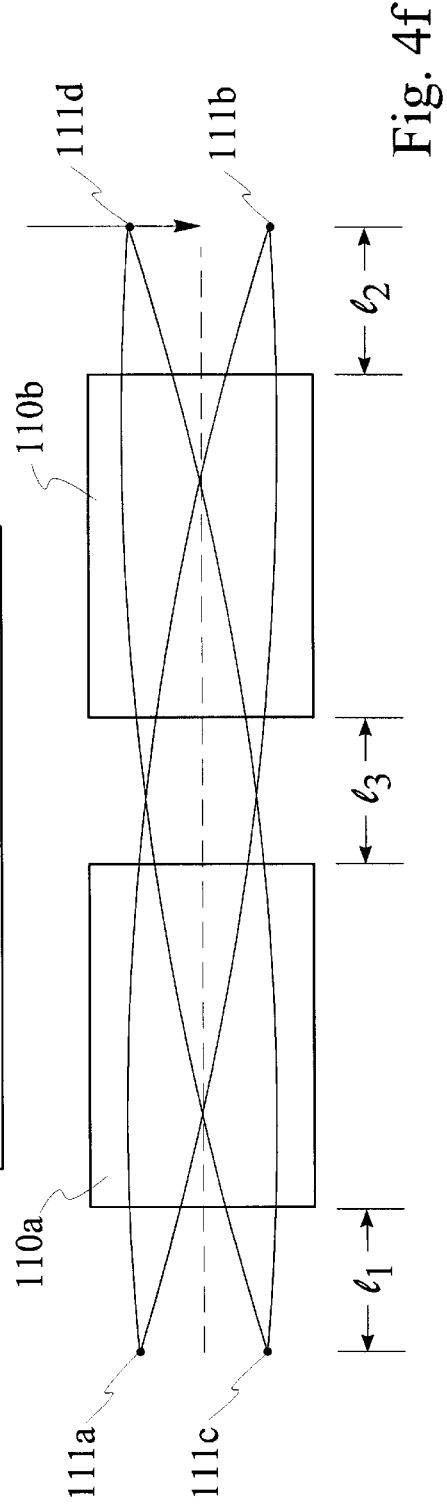
FIG. 4f is a side view of an arrangement of a pair of back to back spaced GRIN lenses having input/output waveguides positioned offset from the optical axes of the lenses in accordance with this invention.

In accordance with an aspect of this invention, and as is shown in FIG. 4f, light can efficiently be coupled from an input waveguide to an output waveguide that are both substantially parallel with an optical axis of one of the lenses 110a or 111b by ensuring that the spacing of the input waveguides and the spacing between adjacent lenses is within a predetermined ratio. More particularly, the lenses 110a and 110b shown in FIG. 4f are spaced an optical distance $l_3$. The input waveguides 111a and 111c are an optical distance $l_1$ from the end face of the lens 110a . The output waveguides 111b and 111d are an optical distance $l_2$ from their adjacent lens 110b.

For optimum coupling to exist, and for the input and output optical waveguides to have th optical axes parallel with the optical axis of the coaxial lenses, the following relationship should exist: $l_1$ $l_2$ $0.5$ $l_3$.

Referring once again to FIG. 3d, two identical birefringent crystals 50a and 50b are shown wherein each is half the length of the crystal 30. Disposed between the crystals 50a and 50b are two substantially focusing lenses having their focus location a distance from their end faces, midway between the lenses 42. Waveguides 16a and 16b are coupled to an end of one of the crystals 50a and waveguide 16c is coupled to the crystal 50b.

In operation, o-ray oriented light launched into port 16a is directed to port 16c across the device as in the previous embodiments and e-ray oriented light launched into port 16b is directed to port 16c for combining with the o-ray oriented light. However, since the crystal 50a is shorter than the crystal 30, the beam entering the lens 42 adjacent 50a is much smaller and a preferred portion of the crystal lens 50a is used. Similarly the region about the periphery of the crystal lens 50b is unused and optimum coupling is achieved from the port at the distance $2d_1$ between the two lenses is twice the distance $d_1$ from the ports to the nearest lens.

Although in the exemplary embodiments shown, the lenses are illustrated as having end faces that are orthogonal to the lens axis, in practice, the lens may be polished and slanted to reduce the affect of unwanted back reflections.

Figure 7:
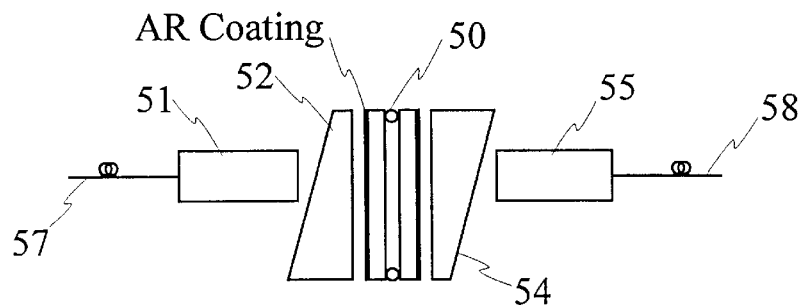
Figure 8:
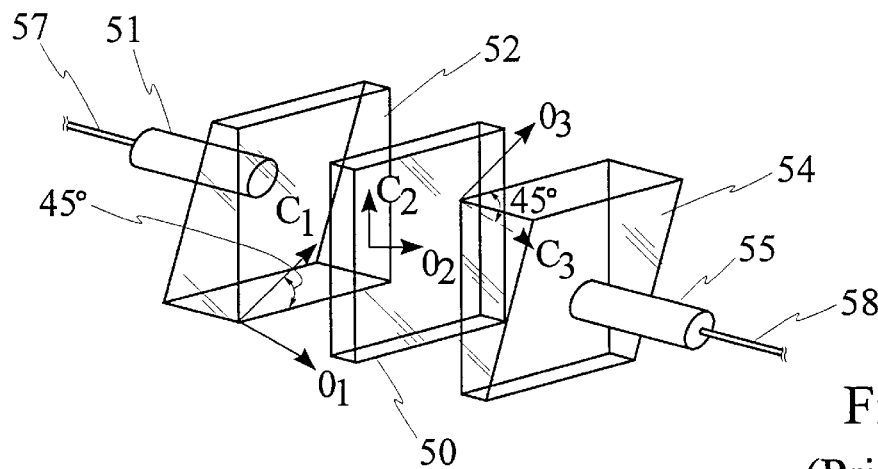
Figure 9:
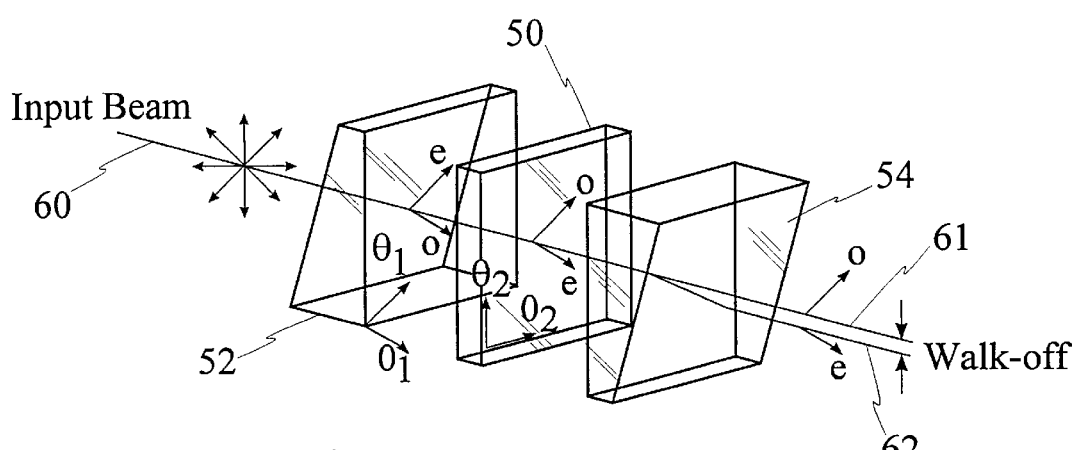

Turning now to FIG. 9, a prior art optical attenuator/switch is shown, having a first GRIN lens 51 associated with an input fibre 57, a second GRIN lens 55 associated with an output fibre, a first wedge-shaped birefringent polarizer 52, a liquid crystal cell 50, and a second wedge-shaped birefringent polarizer 54. The ferrules holding the fibres 57 and 58 are not shown here but are shown in FIG. 10 as 57 and 58. Responsive to a control signal the liquid crystal cell 50 controllably rotates the light signals from the first GRIN lens 51. Depending on the resulting state of the liquid crystal cell 50, the optical signal may or may not be transmitted to the output fibre 58. Of course the strength of the signal can also be adjusted so that the device operates as an attenuator. FIG. 8 illustrates the orientation of the various optical axes of the polarizers 52 and 54 and the liquid crystal cell 50 of FIG. 7. The optical axis of the first polarizer 52, is arranged in an arbitrary direction perpendicular to the line of travel of the collimated light signal from the first GRIN lens 51. The optical axis of the second polarizer 54 is arranged so that it is rotated 90 degrees from the optical axis of the first polarize 52 and perpendicular to the line of travel of the collimated light beam. When the cell 50 is turned on, the optical axis of the liquid crystal is 45 degrees from the optical axis of the first polarizer 52 and the cell 50 has a thickness such that there is 180 degrees phase retardation of the light signal as it travels through the cell 50.

The operation of this prior art switch/attenuator is illustrated in FIG. 9, wherein the cell 50 is turned on so that the liquid crystals in the cell 50 are aligned. An incident beam 60 strikes the first birefringent polarizer 52 and is split into the two polarization modes, one for the extraordinary ray and the other for the ordinary ray. With the liquid crystal cell 50 turned on, the light signal is rotated 90 degrees. In other words, the extraordinary light ray is polarized along the extraordinary axis of the polarizer 52.

As was discussed in the background of this invention, this prior art configuration has several drawbacks, resulting in increased cost of the device; these are, the requirement of two crystals, the thickness of the crystals required in the embodiments shown, wherein collimated beams propagate through these crystals.

Referring now to FIG. 5, a preferred embodiment of this invention is shown, wherein a lens 105 is disposed between a polarization rotator 132 and a small birefringent crystal 130. The polarization rotator 132 can be of any type such as a Faraday rotator wherein the polarization state of light propagating therethrough can be controllably changed, for example by varying a voltage or current to vary the field about the rotator 132.

Alternatively a lithium-niobate crystal can be used with a controllable field applied to vary the refractive index, which in turn will vary the phase of the light propagating therethrough, or yet alternatively a liquid crystal can be used as is described above. Adjacent to the polarization rotator 132 is a deflecting element in the form of a mirror 136 disposed to deflect collimated incident light launched into the input port 110a in a backwards direction to the output port 110b If the polarization state of light propagating through the polarization rotator is not varied, essentially all of the light launched into the input port 110a will couple into the output port 110b. As the polarization state is changed by applying an appropriate control signal to the rotator 132 to rotate the light propagating therethrough, the reflecting beam will only partially couple into the output port 110b. By accurately controlling the amount of rotation provided by the rotator 132, the degree of attenuation can be accurately controlled. For optimum coupling it is preferable if the distance from the ports to the input/focusing face of the lens 105 is equal to the distance from the output/collimating end face of the lens to the mirror 136.

Embodiments of the invention shown in FIGS. 6 rely on providing a lens at an input end of the device between the input/output ports and a crystal. Although these embodiments are less preferable than the embodiment shown in FIG. 5, they do offer a significant advantage over prior art attenuators as only one crystal is required. Providing two large matched crystals substantially adds to the cost of an attenuator.

Turning now to FIG. 6, an attenuator is shown having an input and an output port 110a and 110b respectively, adjacent a collimating substantially quarter pitch GRIN lens 105. Next to the lens 105 is a birefringent crystal 140, sized to receive a collimating beam and to separate the beam into two orthogonal polarized beams. A rotator 132 positioned to receive light from the crystal and a deflecting element in the form of a partially transmissive deflector 146 is disposed to route an incoming beam launched into port 110a in a substantially backwards toward the output port 110b.A monitor in the form of a detector 141 is disposed to detect the small portion of light that leaked through the partially transmissive deflector. Advantageously, by providing this folded configuration, only a single crystal is required for separating an incoming beam into two beams, and in an opposite direction for combining the two beams into a single beam.

In all of the embodiments of the optical attenuator described heretofore, in accordance with this invention, light is launched into an end of the device and is received at a same end of the device. Deflectors such as mirrors, reflectors, and corner cubes can be used to provide a folded configuration. A further advantage can be realized by providing a configuration wherein an uncollimated beam of light is launched into a small relatively thin crystal prior to collimation of the light.

In summary, the advantages of the structure according to this invention are numerous. Smaller and fewer components are required and hence the device is considerably less expensive to manufacture. Furthermore, the device can be smaller than prior art devices that perform a polarization combining or splitting function.

Of course, numerous other embodiments may be envisaged, without departing from the spirit and scope of the invention.

What is claimed is:

1. An optical attenuator comprising:

an input waveguide and an output waveguide;

a lens having a substantially collimating end face and a substantially focusing end face;

a birefringent crystal coupled with the lens for separating or combining orthogonal polarized beams of light;

a deflector for directing an incident beam launched into the input waveguide toward the output waveguide, the input and output waveguides adjacent the lens for launching light to the lens or for receiving light from the lens, the waveguides each having ends separated from a nearest end of the lens by an optical distance of approximately $d_1$, an optical distance between the substantially collimating end face of the lens and the deflector being d1, wherein $d_1>0$; and, a polarization rotator disposed between the birefringent crystal and the deflector for rotating the polarization of light passing therethrough.

2. An optical attenuator as defined in claim 1 further including tapping means for tapping and detecting a portion of light that has leaked through the deflector.

3. An optical attenuator comprising:

an input port and an output port at a first end of the device;

a lens having a substantially collimating end face and a substantially focusing end face;

a birefringent crystal coupled with the lens for separating or combining orthogonal polarized beams of light, the birefringent crystal being disposed adjacent to the input and output ports to receive uncollimated light from the input port;

a deflector having a reflective surface for directing an incident beam launched into the input port toward the output port, the input and output ports adjacent the lens for launching light to the lens or for receiving light from the lens, the ports separated from a nearest end of the lens by an optical distance of approximately $d_1$, an optical distance between the substantially collimating end face of the lens and the deflector being d1, wherein $d_1>0$; and, a polarization rotator disposed between the birefringent crystal and the reflective surface, for rotating the polarization of light passing therethrough.

* * * * *

UNITED STATES PATENT AND TRADEMARK OFFICE
CERTIFICATE OF CORRECTION

PATENT NO.   : 6,055,104
DATED        : April 25, 2000
INVENTOR(S)  : Cheng

Page 1 of 1

It is certified that error appears in the above-identified patent and that said Letters Patent is hereby corrected as shown below:

Column 6,
Line 59, "th" should read -- the --
Line 61, "$l_1\ l_2\ 0.5\ l_3$" should read -- $l_1 \approx l_2 \approx 0.5\ l_3$ --

Column 7,
Line 48, "polarize" should read -- polarizer --

Signed and Sealed this

Seventeenth Day of July, 2001

*Attest:*

Nicholas P. Godici

NICHOLAS P. GODICI
*Attesting Officer*   *Acting Director of the United States Patent and Trademark Office*